US006447042B1

(12) United States Patent
Jin

(10) Patent No.: US 6,447,042 B1
(45) Date of Patent: Sep. 10, 2002

(54) DUAL LOCKING STRUCTURE OF TRUNK LID FOR BURGLARPROOF

(75) Inventor: Keon Soo Jin, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/721,620

(22) Filed: Nov. 27, 2000

(30) Foreign Application Priority Data

Dec. 30, 1999 (KR) ........................................... 99-67241

(51) Int. Cl.[7] ............................................... B62D 25/12
(52) U.S. Cl. ......................................... 296/76; 362/549
(58) Field of Search ............................ 362/549; 296/76

(56) References Cited

U.S. PATENT DOCUMENTS 2,903,570 A * 9/1959 Worden
3,814,928 A * 6/1974 Grosseau
4,503,487 A * 3/1985 Kakuda
5,975,733 A * 11/1999 Gallegos et al. ............ 362/549

* cited by examiner

*Primary Examiner*—Dennis H. Pedder
(74) *Attorney, Agent, or Firm*—Birch, Stewart, Kolasch & Birch, LLP

(57) ABSTRACT

The present invention is related to a dual locking structure of a trunk lid for burglarproof and more particularly, to the dual locking structure. for burglarproof comprising a protector mounted inside of a trunk lid panel and fixed firmly therewith by inserting a retainer, wherein said retainer is designed to be fixed with a lid plate lamp outside of the trunk lid panel and simultaneously to hold firmly said protector not to be removed from the trunk lid panel even though a screw for fixing the retainer is removed.

5 Claims, 1 Drawing Sheet

DUAL LOCKING STRUCTURE OF TRUNK LID FOR BURGLARPROOF

BACKGROUND OF THE INVENTION

1. Field of the Invention

The present invention is related to a dual locking structure of a trunk lid for burglarproof and more particularly, to the dual locking structure for burglarproof comprising a protector mounted inside of a trunk lid panel and fixed firmly therewith by inserting a retainer, wherein said retainer is designed to be fixed with a lid plate lamp outside of the trunk lid panel and simultaneously to hold firmly said protector not to be removed from the trunk lid panel even though a screw for fixing the retainer is removed.

2. Information Disclosures Statement

Generally, a lid plate lamp which is one of lamps in an automobile is mounted to a trunk lid in order to enhance an appearance of the automobile and gives drivers in rear signal that this lamp is on operation.

The lid plate lamp is mounted on a trunk lid panel as a rear portion of the trunk lid and then an appearance thereof is finished by a trunk lid garnish.

In the conventional lid plate lamp, however, there is a problem that the lamp is removed easily from a body by removing a screw for fixing the trunk lid garnish and a screw for fixing the lid plate lamp.

Also, recently, a latch rod for locking the trunk lid can be operated through an aperture for mounting the lid plate lamp to open the trunk and steal goods stored in the trunk. Therefore, it is necessary to provide a solution for solving these problems.

SUMMARY OF THE INVENTION

An object of the present invention is to provide a dual locking structure of the trunk lid that can solve problems as described above.

In the dual locking structure of the trunk lid according to the present invention, a protector is installed inside of a trunk lid panel and fixed firmly bad inserting a retainer which is designed to be fixed with a lid plate lamp outside of the trunk lid panel so that the retainer fixed with the protector cannot be removed from outside of the trunk lid panel. Therefore, a locking status of the trunk latch lid cannot be released and thus, a burglarproof can be achieved.

BRIEF DESCRIPTION OF THE DRAWINGS

For fuller understanding of the nature and objects of the invention, reference should be had to the following detailed description taken in conjunction with the accompanying drawing in which.

DETAILED DESCRIPTION OF THE INVENTION

Figure 1:
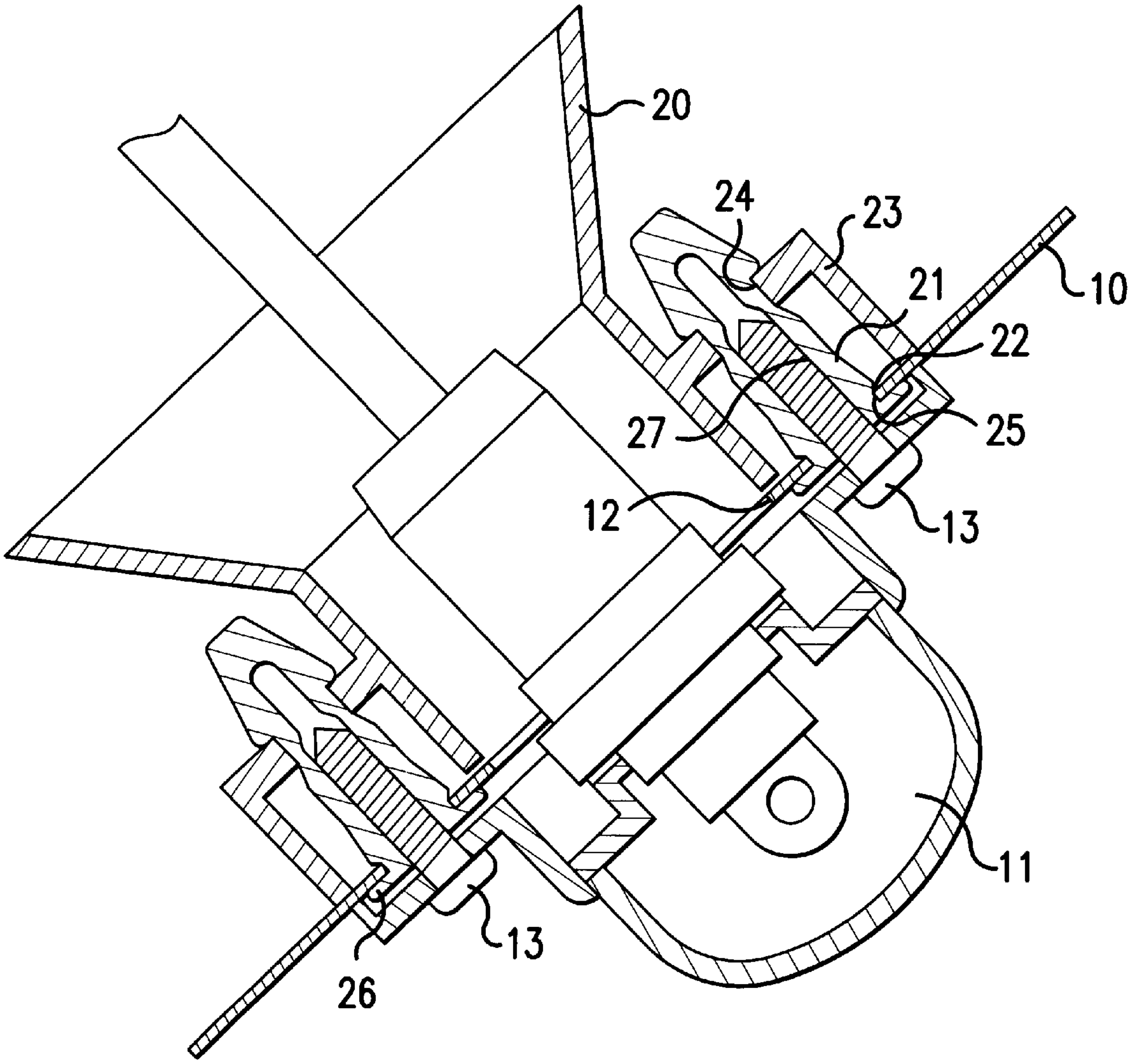
FIG. 1 is a sectional view, showing a lid. plate lamp joined by means of a dual lock structure according to the present invention.

FIG. 1 is a sectional view showing a lid plate lamp joined by means of a dual lock structure according to the present invention, reference numeral 10 indicates a trunk lid panel, and reference numeral 11 indicates a lid plate lamp, respectively.

In the present invention, in order to prevent a trunk latch rod (not shown) from operating through an installing aperture after removing the lid plate lamp 11 from the trunk lid panel 10, a protector 20 is mounted inside of the trunk lid panel 10 on which the lid plate lamp 11 is installed. The protector 20 is fixed firmly by a retainer 21 not to be removed from outside of the trunk lid panel 10. Therefore, the protector 20 is locked in dual by the retainer 21 so that the trunk latch rod cannot be operated through an installing aperture 12.

The detailed descriptions regarding the protector 20 and the retainer 21 are as follows.

The protector 20 is a thin cylindrical shape and acts to prevent from stealing having flanges 23 with fixing apertures 22 outside of the cylinder.

The protector 20 is mounted to the inner portion of the installing aperture 12 on the trunk lid panel 10 by at least two retainers 21.

The retainer 21 is a hollow rod shape with a certain length. A jaw 24 is formed at one end portion of the retainer 21 and a groove 25 and a finger head 26 at the other end portion of the retainer 21. Especially, the jaw portion 24 is fixed into the installing aperture 22 of the flange 23 so that the protector 20 and the retainer 21 are combined together. Further, the groove 25 and the finger head 26 of the retainer 21 are to insert the trunk lid panel 10 to be fixed firmly.

A fixing means 13 for mounting the trunk hd panel 10 is inserted into a hollow 27 having a rod shape in longitudinal direction to the retainer 21.

That is, the protector 20 is positioned inside of the trunk lid panel 10 by joining with the retainer 21 fixed to the trunk lid panel 10.

As described above, the retainer 21 joined with the trunk lid panel 10 is fixed by the fixing means 13 as shown in FIG. 1.

Therefore, the protector 20 is not joined directly to the trunk lid panel 10 but is joined by the retainer 21 fixed to the trunk lid panel 10 and the fixing means 13 in dual.

In the present invention as described above, the protector is positioned inside of the trunk lid panel, the retainer is fixed to the protector and the trunk lid panel, and the lid plate lamp is fixed to the trunk lid panel by the fixing means so that the lid plate lamp is locked by the fixing means and the protector in dual, whereby this dual locking structure of the present invention can reduce danger of stolen goods stored in the trunk.

Although this invention has been described in its preferred form with a certain degree of particularity, it is appreciated by those skilled in the art that the present invention disclosure of the preferred form has been made only by way of example and that numerous changes in the details of the construction, combination and arrangement of parts may be resorted to without departing from the spirit and scope of the invention.

What is claimed is:

1. A dual locking structure of a trunk lid comprising:

a trunk light assembly mounted on the trunk lid including a lamp removably mountable adjacent a mounting aperture in the trunk lid for accommodating the light assembly therein; and a protector mounted inside of a trunk lid; wherein said protector is fixed by retainers to the trunk lid said protector preventing access to a locking assembly of the trunk lid from outside the trunk lid through said mounting aperture.

2. The dual locking structure of the trunk lid of claim 1, wherein said protector is a thin cylindrical shape having flanges with fixing apertures outside of the cylinder.

3. The dual locking structure of the trunk lid of claim 1, wherein said retainer has a hollow rod shape with a certain length, and has a jaw at one end portion thereof and a groove and a finger head at the other end portion.

4. The dual locking structure of the trunk lid of claim 1 wherein said retainer has a hollow extended in longitudinal direction thereof.

5. The dual locking structure of the trunk lid of claim 3, wherein said retainer has a hollow extended in longitudinal direction thereof.

* * * * *